United States Patent

Vaeth et al.

[11] 4,034,208

[45] July 5, 1977

[54] ACCELERATION AIDED TRACKING OF A DESIGNATED TARGET

[75] Inventors: James E. Vaeth, Baltimore; Brewton O. Van Hook, Ellicott City, both of Md.

[73] Assignee: Westinghouse Electric Corporation, Pittsburgh, Pa.

[22] Filed: Feb. 25, 1976

[21] Appl. No.: 661,073

[52] U.S. Cl. ................... 235/61.5 S; 235/61.5 R; 358/125
[51] Int. Cl.² ................... G06G 7/80; H04N 5/14
[58] Field of Search ................ 235/61.5 R, 61.5 S; 178/DIG. 21, DIG. 38; 358/125, 126

[56] References Cited

UNITED STATES PATENTS

| 3,507,991 | 4/1970 | Scotchie et al. | 178/DIG. 21 |
| 3,562,423 | 2/1971 | Murphy | 178/DIG. 21 |
| 3,603,686 | 9/1971 | Payne | 178/DIG. 21 |
| 3,729,582 | 4/1973 | Deye et al. | 178/DIG. 21 |
| 3,775,558 | 11/1973 | Moulton | 178/DIG. 21 |

Primary Examiner—Felix D. Gruber
Attorney, Agent, or Firm—H. W. Patterson

[57] ABSTRACT

An angular acceleration aided system for electrooptical tracking of a designated target which operates independently of an inertial navigation system. The designated target point, as viewed by a gimbaled electro-optical sensor is portrayed on a video display where a human operator compensates for deviation in the tracking beam from the line-of-sight to the target by providing a rate command signal to the azimuth axis servo of the gimbaled sensor through a parallel combination of an integrator and an amplifier and, also, by providing a rate command signal to the elevation axis servo of the gimbaled sensor through a parallel combination of an amplifier and an integrator provided with a feedback circuit which establishes an acceleration aiding signal for the elevation axis.

10 Claims, 6 Drawing Figures

ACCELERATION AIDED TRACKING OF A DESIGNATED TARGET

BACKGROUND OF THE INVENTION

1. Field of the Invention

The disclosed invention relates to a simplified acceleration aiding mechanization for electro-optical tracking of a designated target.

2. Description of the Prior Art

A number of airborne, electro-optical tracking systems have been developed which designate a target by reference to the line-of-sight of a television camera or a forward looking infrared camera as determined by a gimbaled optical sensor controlled by azimuth and elevation servos. The azimuth and elevation servos have been controlled either manually, by using a tracking control handle to center the target in a video display, or automatically, by using an automatic tracking sensor such as a video tracker or laser spot tracker. In the prior art tracking mechanizations, the manual tracking control handle or automatic tracking sensor controls azimuth and elevation non-linear gain amplifiers associated with parallel integrator-amplifier combinations to provide azimuth and elevation rate error signals. Conventional computations are performed on the aircraft velocity and attitude signals from the aircraft inertial navigation system and on range signals from a slant range sensor to provide azimuth and elevation rate aiding signals. The azimuth and elevation rate error signals are added to the computed azimuth and elevation rate aiding signals to provide azimuth and elevation rate command signals to control the respective azimuth and elevation servos of the gimbaled sensor.

In either the manual or automatic tracking mode of the prior art, the computed line-of-sight rate aiding signals, compensate for the motion of the aircraft relative to the target, thereby significantly improving tracking accuracy in a dynamic situation. It has been substantiated that dynamic tracking accuracy depends primarily upon the magnitude of the line-of-sight angular rotation rate and angular acceleration; upon the accuracies of the computed line-of-sight rate aiding signals, and upon the control authority given to the manual tracking control handle or the automatic tracking device. The availability of accurate rate aiding signals reduces the range of control authority required for the manual control handle or the automatic tracking device, thereby improving tracking accuracy by limiting threshold noise and/or manual and automatic overcontrol degradations. In the manual system, accurate rate aiding signals also ease the operator's control task and improve his learning curve.

If the computed rate aiding signals are accurate, the operator's tracking task is relatively simple and tracking accuracy is well within acceptable tolerances. However, as rate aiding accuracy degrades, tracking errors increase and tend to peak at maximum velocity/height (V/D) flyover conditions. For example, a simulated ten percent aiding error roughly triples the tracking inaccuracy at a flyover (V/D) of 0.2 sec. $^{-1}$. On an aircraft not equipped with an inertial navigation system, or on which the inertial navigation system becomes inoperative, the azimuth and elevation rate aiding signals cannot be provided by the conventional computations. Without rate aiding for at least the elevation servo, the operator's control authority and the operator's human reflexes have proved inadequate to compensate for dynamic errors in tracking the target. Therefore, there was a need for a device which would provide elevation rate aiding for austere aircraft not equipped with an inertial navigation system. Additionally, in those aircraft equipped with inertial navigation systems, there was a need for a tracking aiding device which would produce elevation rate aiding signals in the event that the inertial navigation system of the aircraft became inoperative.

SUMMARY OF THE INVENTION

In a system for tracking a designated target in relation to a line-of-sight controlled through a gimbaled sensor, azimuth error signals are applied to an azimuth rate amplifier in parallel with an azimuth integrator which together provide an azimuth rate command signal to the azimuth servo of a gimbaled sensor. Elevation error signals are applied to an elevation rate amplifier in parallel with an elevation integrator which together provide an elevation rate command signal to the elevation servo of a gimbaled sensor. An acceleration aiding circuit is contained in a feedback loop around the elevation integrator to provide an acceleration aiding signal to the elevation control of the gimbaled sensor. The elevation acceleration aiding circuit brings dynamic tracking accuracy of the target within tolerances such that a human operator may compensate for tracking errors in the absence of an inertial navigation system despite high elevation rotation rates and accelerations for the gimbaled sensor.

PREFERRED EMBODIMENT OF THE INVENTION

Figure 1:
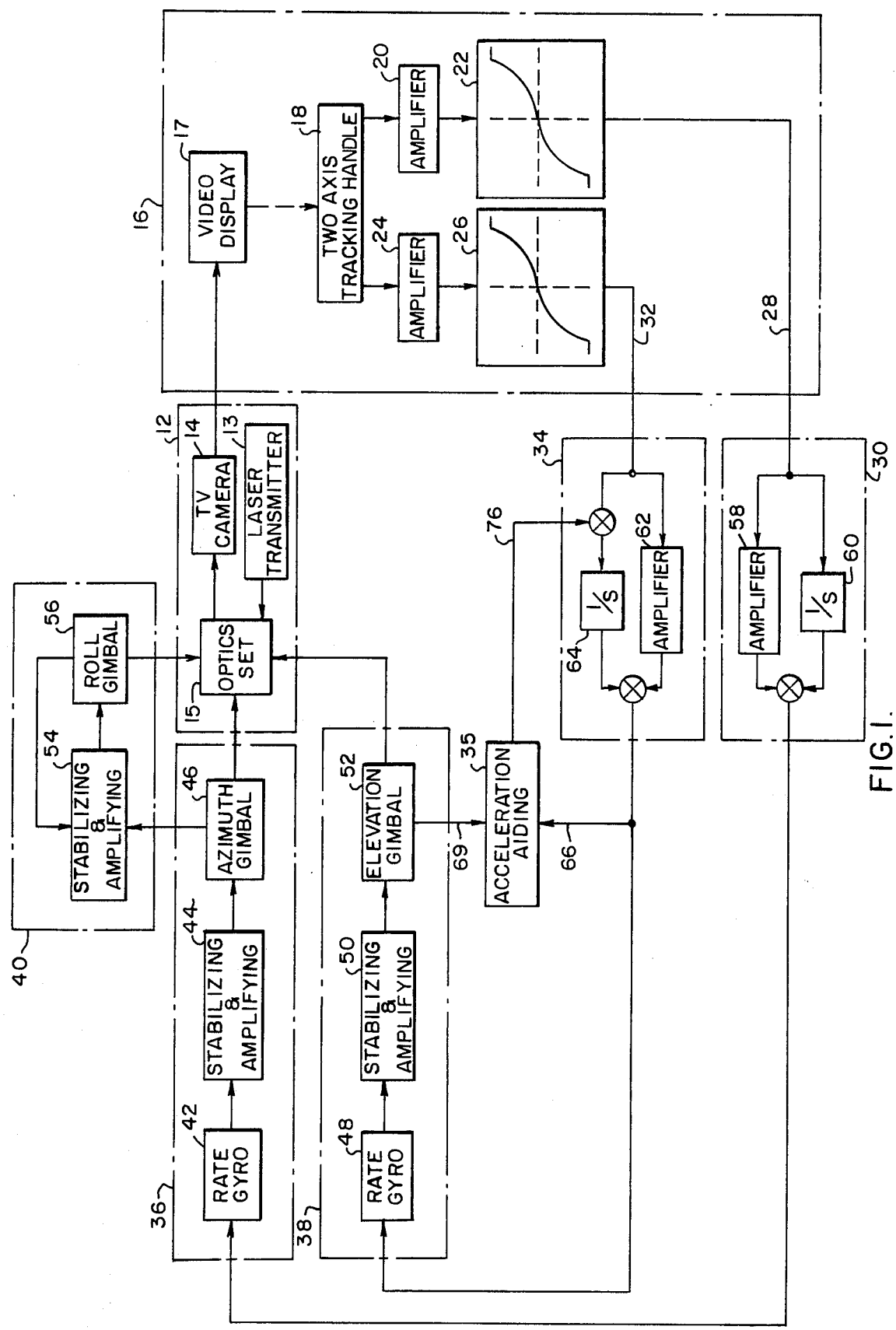
FIG. 1 is a block diagram of the disclosed rate aiding mechanization for a manual electro-optical tracking system.

FIG. 1 shows the preferred embodiment of the disclosed acceleration aided tracking method and apparatus as contained in a manual, electro-optical tracking system which designates a target by reference to the line-of-sight of a three-axis gimbaled sensor 12.

Three-axis gimbaled sensor 12 is comprised of a laser transmitter 13, a television camera 14 and an optics set 15.

The target is designated by a laser beam produced by laser transmitter 13 and transmitted through optics set 15 contained in a three-axis gimbaled mounting. The line-of-sight of television camera 14 is co-aligned with the beam of laser transmitter 13, and, together with the beam of laser transmitter 13, is controlled through the gimbaled optics set 15 in response to a tracking means 16.

Tracking means 16 is comprised of a video display 17, a two-axis tracking handle 18, an azimuth amplifier 20, a non-linear azimuth amplifier 22, an elevation amplifier 24, and a non-linear elevation amplifier 26.

A view along the line-of-sight of camera 14 is displayed on video display 17 whose viewing screen is provided with cross-hairs (not shown) which intersect at the line-of-sight of camera 14. Laser transmitter 13 and television camera 14 are so disposed that the target point designated by the beam of laser transmitter 13 is also coincident with the point of intersection of the cross-hairs on the screen of video display 17. From the cross-hairs of video display 17, a human operator views the target designated by the laser transmitter 13 as seen by television camera 14 through optics set 15 and compares this with a selected target within the view of video display 17. The operator compensates for deviations of the cross-hairs from the selected target by manipulating two-axis tracking handle 18.

When two-axis tracking handle 18 is moved along a first axis, it operates through azimuth amplifier 20 and non-linear azimuth amplifier 22 to provide an azimuth error signal on line 28 to azimuth control 30. When two-axis tracking handle 18 is moved along a second axis, it operates through elevation amplifier 24 and non-linear elevation amplifier 26 to provide an elevation error signal on line 32 to elevation control 34. Azimuth amplifier 20 and elevation amplifier 24 may be comprised of any suitable amplifier as is well known in the art. Non-linear azimuth amplifier 22 and non-linear elevation amplifer 26, which are also well known, amplify the signals received from azimuth amplifier 20 and elevation amplifier 24 respectively in non-linear proportion to the distance two-axis tracking handle 18 is moved from its center position. Non-linear amplifiers 22 and 26 permit increased error signal accuracy by providing low gain when two-axis tracking handle 18 is near its center position and permit wide correction range by providing high gain when two-axis tracking handle 18 is near the limits of its displacement from its center position.

In this manner, two-axis tracking handle 18 provides error signals to the disclosed improvement, which includes azimuth control 30, elevation control 34 and acceleration aiding control 35, to provide the azimuth and elevation rate command signals to azimuth and elevation servos 36 and 38 which, together with roll servo 40, control the position of the optics set 15 of three-axis gimbaled sensor 12. Azimuth control 30 provides a means for establishing the azimuth angular rate command for the gimbaled sensor 12 in response to an azimuth error signal provided by the tracking control means 16. Elevation control 34 provides a means for establishing the elevation angular rate command for the gimbaled sensor in response to the elevation error signal provided by the tracking control means 16, and in response to elevation angular acceleration aiding for the gimbaled sensor 12. Acceleration aiding control 35 provides a means for establishing the elevation angular acceleration aiding of said gimbaled sensor 12 in response to the elevation angular rate command established by said elevation control 34, and in response to the elevation deflection angle $\lambda_E$ of said gimbaled sensor 12. That is, two-axis tracking handle 18 provides error signals to azimuth and elevation controls 30 and 34 which provide the azimuth and elevation rate command signals to azimuth and elevation servos 36 and 38 which, together with roll servo 40, control the position of the optics set 15 of three-axis gimbaled sensor 12.

As is well known to those skilled in the pertinent art, azimuth servo 36 may be comprised of rate gyro 42, stabilizing and amplifying network 44, and azimuth gimbal 46; elevation servo 38 may be comprised of rate gyro 48, stablizing and amplifying network 50 and elevation gimbal 52; and roll servo 40 may be comprised of stabilizing and amplifying network 54 and roll gimbal 56.

In the preferred embodiment, the gimbaled optics set 15 is positioned in the rotatable head of a pod container such that the outer gimbal axis is the roll axis. Since the roll axis of the three-axis gimbaled optics set 15 is the outer axis, the elevation and azimuth axes, which are the middle and inner axes respectively, maintain their orientation with respect to the target despite roll maneuvers of the aircraft. As has been in use for several years and as known and understood by those skilled in the art, to achieve a wide field of tracking, the entire head of the pod is rotated about the pod's roll axis by the roll servo 40 such that roll servo 40 causes the optics set 15 to maintain a substantially zero rotation about its azimuth axis. In azimuth, therefore, the optics set 15 need produce only limited motion to either side of its center position.

Figure 2:
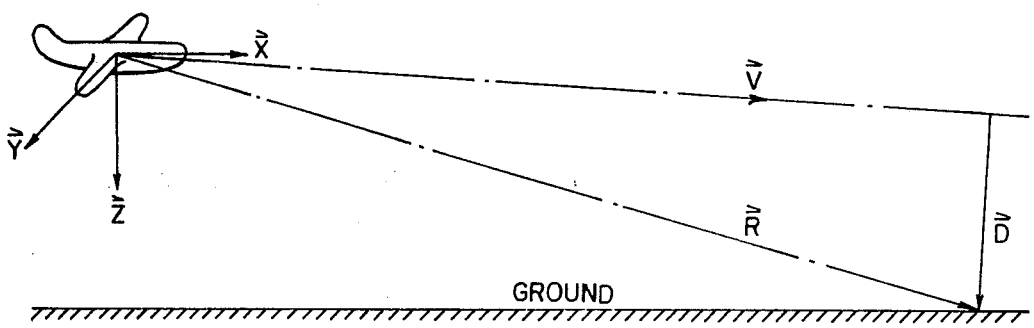
FIG. 2 illustrates the geometrical relationship of the velocity vector $\vec{V}$, the flyby range vector $\vec{D}$, the instantaneous range vector $\vec{R}$, and the aircraft coordinate axes X, Y, and Z.
Figure 3:
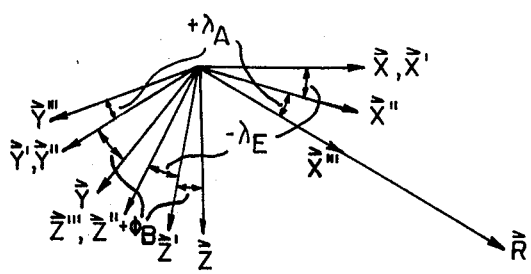
FIG. 3 illustrates the geometrical relationship of the pitch deflection ($\lambda_E$), the yaw deflection ($\lambda_A$), and the roll deflection ($\phi_B$) of the three-gimbaled sensor.

The azimuth, elevation and roll servos 36, 38, and 40 respectively produce the yaw, pitch and roll deflection angles $\lambda_A$, $\lambda_E$, and $\phi_B$ of gimbaled sensor 12. These deflection angles are defined in relation to FIGS. 2 and 3. FIG. 2 illustrates the vector relationships of an aircraft flying toward a ground target. X represents the aircraft longitudinal or "roll" axis, Y represents the aircraft elevation or "pitch" axis, and Z represents the aircraft azimuth or "yaw" axis. R represents the instantaneous range of a line-of-sight between the origin of the aircraft axes and the target point, $\vec{V}$ represents the velocity vector of the origin of the aircraft axis, and $\vec{D}$ represents the flyover range which is the perpendicular distance from the direction of the velocity vector V to the target. FIG. 3 defines the gimbal deflection angles $\lambda_A$, $\lambda_E$, and $\phi_B$ in relation to the XYZ aircraft axes and the range vector R where $\phi_B$, $\lambda_E$, and $\lambda_A$ are obtained as the result of an Eulerian rotation about the X, Y' and Z'' axes respectively to arrive at range vector R.

Figure 4:
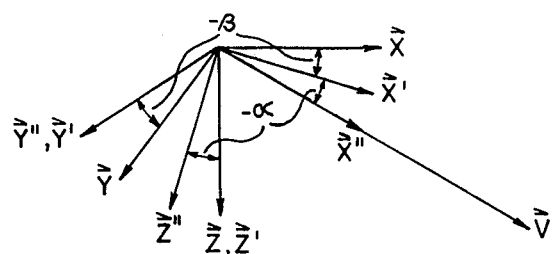
FIG. 4 illustrates the geometrical relationship of the aircraft angle of attack ($\alpha$), and the aircraft sideslip angle ($\beta$).

Normally, airplanes travel in a direction substantially along the longitudinal axis of the fuselage so that, referring to FIG. 2, the aircraft velocity vector $\vec{V}$ is essentially in-line with the roll X and essentially perpendicular to the elevation axis Y. However, in the course of aircraft maneuvers, such as are commonly experienced by military airplanes attempting to elude ground fire after striking a target, the airplane velocity vector is no longer essentially in-line with the X axis or essentially perpendicular to the Y axis. FIG. 4 defines the aircraft angle of attack $\alpha$ and the sideslip angle $\beta$ in relation to the XYZ aircraft axes and the velocity vector V when the aircraft is experiencing extreme maneuvers over a linear flight path. The aircraft sideslip angle ($\beta$) and the aircraft angle attach ($\alpha$) are defined as a result of an Eulerian rotation about the Z and Y' axes respectively to align the X'' axis with the velocity vector $\vec{V}$.

The disclosed improvement which provides for acceleration aided tracking of a designated target assumes two conditions: first, that the azimuth deflection angle $\lambda_A$ of the gimbaled sensor 12 and the azimuth rate command signal $\omega_k$ provided to azimuth servo 24 are small and, second, that the aircraft angle of attack $\alpha$ and sideslip angle $\beta$ are near zero. The first condition, that the azimuth deflection angle $\lambda_A$ and the azimuth rate command signal $\omega_k$ are small is satisfied by the operation of roll servo 40 as was explained previously. The second condition, that the angle of attack $\alpha$ and the sideslip angle $\beta$ are essentially zero may be presumed during the periods of low and moderate aircraft maneuvering. With $\alpha$ and $\beta$ near zero and the azimuth deflection angle $\lambda_A$ and the azimuth rate command signal $\omega_k$ essentially nulled by the roll servo 40, the elevation deflection angle of optics set 15, which controls the line-of-sight of television camera 14, can be geometrically derived from FIG. 2. For non-accelerated flight, the elevation rate-of-rotation of the gimbaled mirror may be mathematically expressed as:

$$\omega_j = V \sin \lambda_E/R = V \sin^2 \lambda_E/D \qquad (1)$$

where:
$\lambda_E$ is the elevation deflection angle of the gimbaled sensor;
R is the instantaneous range to the target point;
V = aircraft velocity
D = perpendicular distance from the aircraft velocity vector to the target; and
$\omega_j$ = the elevation angular rate of the gimbaled sensor 12 in inertial space.

Taking the derivative of equation (1) gives:

$$\dot{\omega}_j = 2 \sin \lambda_E \cos \lambda_E \omega_j V/D \qquad (2)$$

where
$\dot{\omega}_j$ is the elevation angular acceleration of the gimbaled mirror.

Substituting for $\lambda_E$ from equation (1) gives:
$$\dot{\omega}_j = 2 \omega_j^2/\tan \lambda_E \qquad (3)$$

Therefore, when $\alpha$ and $\beta$ are near zero, and the azimuth line-of-sight rate $\omega_k$ and the azimuth gimbal deflection angle $\lambda_A$ are essentially nulled by the roll gimbal control, the elevation axis acceleration aiding term $\omega_j$ may be determined from the elevation gimbal deflection angle $\lambda_E$ and elevation angular rate $\omega_j$ to significantly reduce the need for line-of-sight elevation control corrections by tracking control means 16.

Referring to the preferred embodiment of the improvement as shown in FIG. 1, azimuth control 30 includes an azimuth rate amplifier 58 which is responsive to the azimuth error signal of said tracking control means 16; and an azimuth integrator 60 which is responsive to the azimuth error signal of said tracking control means, and which is connected in parallel with said azimuth rate amplifier 58 and cooperates with said azimuth rate amplifier 58 to provide the azimuth angular rate command signal to azimuth servo 36. Elevation control 34 includes an elevation rate amplifier 62 which is responsive to the elevation error signal of said tracking control means 16 and an elevation integrator 64 which is responsive to the elevation error signal of said tracking control means 16 and to the elevation angular acceleration aiding provided by acceleration aiding control 35, and which is connected in parallel with said elevation rate amplifier 62 and cooperates with said elevation rate amplifier 62 to provide said elevation angular rate command signal. When two-axis tracking handle 18 is moved along a first axis it provides an azimuth error signal on line 28 which operates through the parallel combination of azimuth integrator 60 and azimuth rate amplifier 58 to provide an azimuth rate command signal $\omega_k$ to control the gyro stabilized azimuth servo 36 which determines the azimuth deflection angle $\lambda_A$ of gimbaled sensor 12. When two-axis tracking handle 18 is moved along a second axis, it provides an error signal on line 32 which operates through the parallel combination of elevation rate amplifier 62 and elevation rate integrator 64 having a feedback loop which contains acceleration aiding control 35, to provide an elevation rate command signal $\omega_j$ to control the gyro stabilized elevation servo 38 which determines the elevation deflection angle $\lambda_E$ of the gimbaled sensor 12. Acceleration aiding control 35 provides an elevation acceleration aiding signal $\dot{\omega}_j$ which is integrated to contribute rate aiding to the command signal $\omega_j$ provided by elevation control 34 to elevation servo 38 in response to the elevation rate command signal $\omega_j$ and the elevation deflection angle $\lambda_E$ of sensor 12 according to equation (3).

As shown in FIG. 1, elevation rate command signal $\omega_j$ is provided to acceleration aiding control 35 from the output of the parallel combination of elevation integrator 64 and elevation amplifier 62, and elevation deflection angle $\lambda_E$ is provided to acceleration aiding control 35 from elevation gimbal 52 of elevation servo 38.

Azimuth rate amplifier 58 and elevation rate amplifier 62 may be comprised of any suitable amplifier as is well known in the art. Similarly, azimuth integrator 60 and elevation integrator 64 may be comprised of any well known integrator component. Acceleration aiding control 35 may be comprised of suitably arranged circuitry components which provide an output according to equation (3). One such arrangement is shown in FIG. 5.

Figure 5:
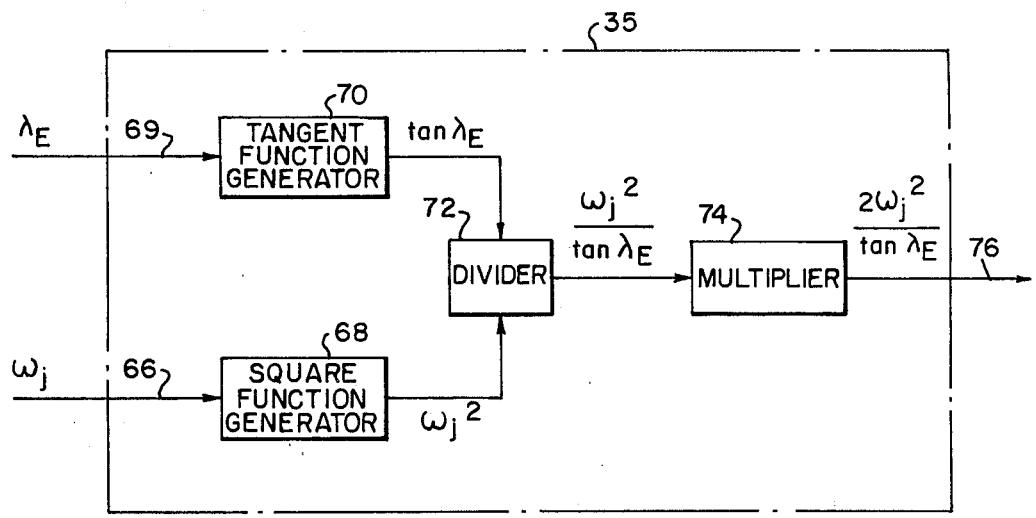
FIG. 5 is a more detailed block diagram of the acceleration aiding circuit shown in FIG. 1.

In FIG. 5, the elevation command signal $\omega_j$ is provided on line 66 to a square function generator 68 which provides an output substantially equal to the square of $\omega_j$. At the same time, the elevation deflection angle $\lambda_E$ of elevation gimbal 52 is provided on line 69 to a tangent function generator 70 which provides an output substantially equal to the tangent of $\lambda_E$. The outputs of square function generator 68 and tangent function generator 70 are provided to a divider 72 whose output is substantially equal to $\omega_j^2/\tan\lambda_E$. The output of divider 72 is provided to multiplier 74 which multiplies the output of divider 72 by a factor of two to provide an acceleration aiding signal $\dot{\omega}_j$ on line 76 which is substantially equal to $2 \omega_j^2/\tan\lambda_E$.

Since the roll gimbal control of gimbaled section 12 maintains the azimuth gimbal angle ($\lambda_A$) small, the line-of-sight angular rate is predominantly about the gimbal elevation axis. Therefore, it is satisfactory that the azimuth control 30 is not acceleration aided despite moderate lateral maneuvers.

Some accuracy degradation relative to ideal rate aiding with both azimuth and elevation acceleration aiding will result during aircraft maneuvers because the disclosed aiding mechanization assumes that the aircraft angle of attack ($\alpha$), sideslip angle ($\beta$), azimuth deflection angle ($\lambda_A$), and azimuth rate aiding signal $\omega_k$ are essentially zero. However, lateral maneuvers near flyover for V/D equal to 0.2 per second, have demonstrated acceptable tracking accuracy.

Figure 6:
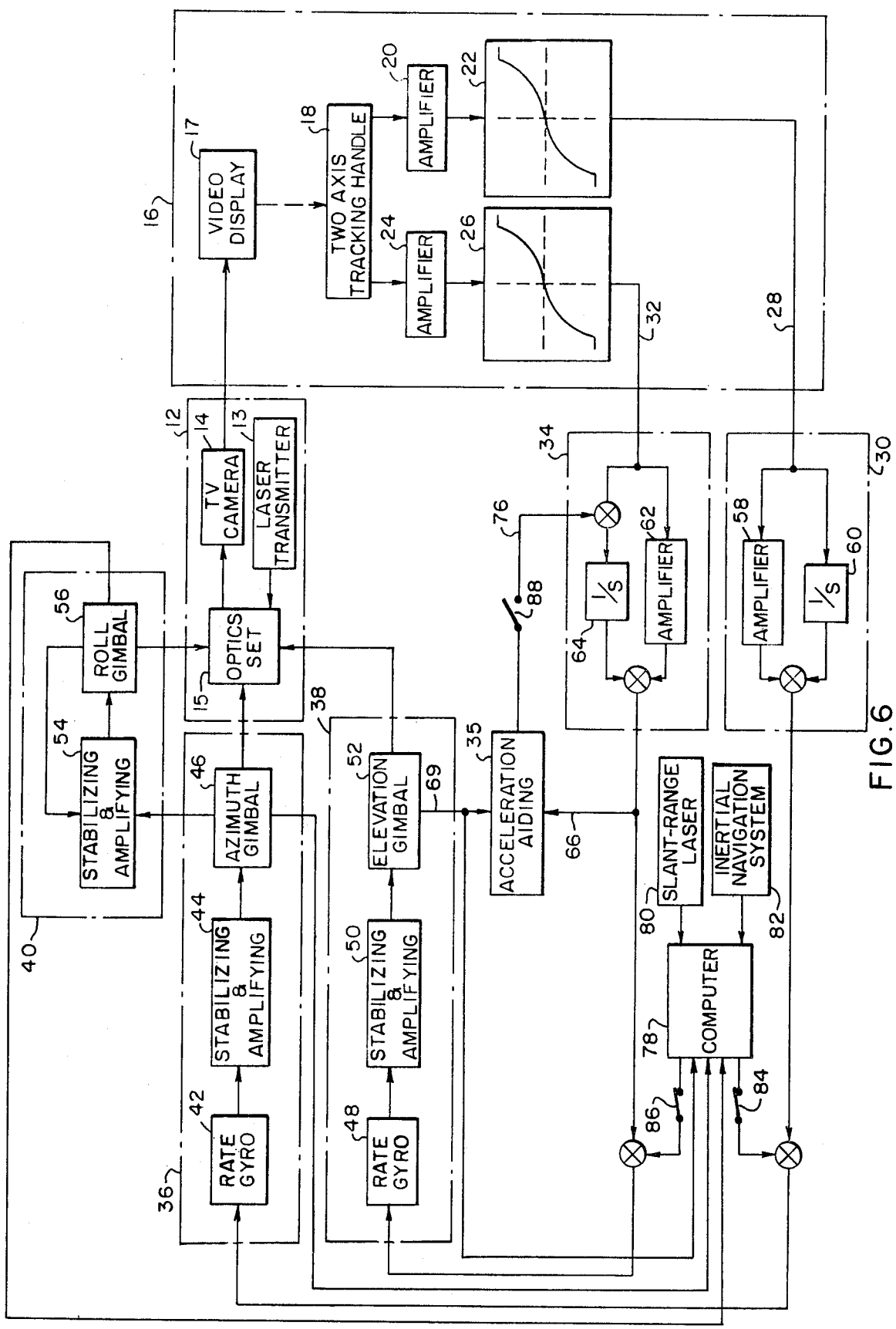
FIG. 6 is a block diagram of a modification of FIG. 1 in which the disclosed acceleration aiding circuit may selectively provide an alternative to a conventional rate aiding system.

FIG. 6 shows a modification of the block diagrm of FIG. 1 in which the disclosed acceleration aiding control 35 may be provided as an alternative to the well-known, conventional rate aiding system. While operating in the conventional mode, the azimuth and elevation line-of-sight rate, aiding signals $\omega_j$ and $\omega_k$, are provided according to conventional rate aiding computations performed by a computer 78 in relation to the electro-optical gimbal angles $\lambda_A$, $\lambda_E$, and $\phi_B$ provided by the azimuth, elevation and roll servos 36, 38 and 40; the range to the target point R provided by a slant-range laser 80, and the aircrat velocity and attitudes provided by the inertial navigation system 82. If the inertial navigation system 82 should fail or the conventional rate aiding system should otherwise become inoperative, it can be replaced by the disclosed acceleration aiding control 35 by opening switches 84 and 86 and closing switch 88.

We claim:

1. A system for tracking an object with respect to the position of a gimbaled sensor that is controlled in response to an azimuth angular rate command signal and in response to an elevation angular rate command signal said system comprising:
   a tracking control means to generate azimuth and elevation error signals;
   an azimuth control for generating the azimuth angular rate command signal to control the gimbaled sensor in response to the generated azimuth error signal;
   an elevation control for generating the elevation angular rate command signal to control the gimbaled sensor in response to the generated elevation error signal and in response to an elevation angular acceleration aiding signal; and
   means for generating the elevation angular acceleration aiding signal in response to the generated elevation angular rate command signal and in response to the elevation deflection angle of said gimbaled sensor to provide acceleration aiding for the elevation control.

2. In a system for tracking a target with respect to the position of a gimbaled sensor that is controlled in relation to azimuth and elevation error signals of a tracking control means, the apparatus comprising:
   an azimuth control for generating an azimuth angular rate command signal to control the gimbaled sensor in response to the generated azimuth error signal;
   an elevation control for generating an elevation angular rate command signal to control the gimbaled sensor in response to the elevation error signal and in response to an elevation angular acceleration aiding signal; and
   means for generating the elevation angular acceleration aiding signal in response to the elevation angular rate command signal and in response to the elevation deflection angle of said gimbaled sensor to provide acceleration aiding for said elevation control.

3. The apparatus of claim 2 wherein the position of said gimbaled sensor is controlled by an elevation servo and wherein said elevation acceleration aiding means provides the elevation angular acceleration aiding signal in response to the elevation angular rate command signal generated by said elevation control, and in response to the elevation deflection angle of said gimbaled sensor as determined by said elevation servo.

4. In a system for tracking a target with respect to a gimbaled sensor whose orientation with respect to the target is determined by azimuth, elevation and roll servos which are controlled in relation to azimuth and elevation error signals determined by a tracking control means, the apparatus comprising:
   an azimuth control for generating an azimuth angular rate command signal to control the azimuth servo in response to the azimuth error signal of the tracking control means;
   an elevation control for generating an elevation angular rate command signal to control the elevation servo in response to the elevation error signal of the tracking control means, and in response to the elevation angular acceleration aiding signal; and
   means for providing acceleration aiding for said elevation control by generating the elevation angular acceleration aiding signal to control said elevation control in response to the elevation angular rate command signal generated by said elevation control and in response to the elevation deflection angle of said gimbaled sensor.

5. The apparatus of claim 4 in which said elevation acceleration aiding means provides the elevation angular acceleration aiding signal to control said elevation control in response to the elevation angular rate command signal generated by said elevation control, and in response to the elevation deflection angle of said gimbaled sensor as determined by said elevation servo.

6. The apparatus of claim 5 in which said elevation control includes:
   an elevation rate amplifier which is responsive to the elevation error signal of said tracking control means; and
   an elevation integrator which is responsive to the elevation error signal of said tracking control means and to the elevation angular acceleration aiding signal generated by said elevation acceleration aiding means, said elevation integrator being connected in parallel with said elevation rate amplifier and cooperating with said elevation rate amplifier to generate said elevation angular rate command signal.

7. The apparatus of claim 6 in which said azimuth control includes:
   an azimuth rate amplifier which is responsive to the azimuth error signal of said tracking control means; and
   an azimuth integrator which is responsive to the azimuth error signal of said tracking control means, said azimuth integrator being connected in parallel with said azimuth rate amplifier and cooperating with said azimuth rate amplifier to generate said azimuth angular rate command signal.

8. The apparatus of claim 5 in which said elevation acceleration aiding means generates the elevation angular acceleration aiding signal for said elevation control according to the relation:

$$\dot{\omega}_j = 2\omega_j^2/\tan\lambda_E$$

where:
   $\dot{\omega}_j$ represents the elevation angular acceleration aiding signal:
   $\omega_j$ represents the elevation angular rate command signal; and
   $\lambda_E$ represents the elevation deflection angle of said gimbaled sensor.

9. For a method of tracking a target with respect to the position of a gimbaled sensor that is controlled in relation to azimuth and elevation error signal determined by a tracking control means, a method for controlling the gimbaled sensor including the steps of:

generating an azimuth angular rate command signal for controlling the gimbaled sensor in response to the azimuth error signal of the tracking control means;

generating an elevation angular rate command signal for controlling the gimbaled sensor in response to the elevation error signal of the tracking control means, and in response to an elevation angular acceleration aiding signal; and generating the elevation angular acceleration aiding signal in response to the elevation angular rate command signal, and in response to the elevation deflection angle of said gimbaled sensor to provide angular acceleration aiding for said step of generating an elevation angular rate command signal.

10. The method of claim 9 in which said step of generating the elevation angular acceleration aiding signal generates said elevation angular acceleration aiding signal according to the relation:

$\dot{\omega}_j = 2\omega_j^2/\tan\lambda_E$ where:
- $\dot{\omega}_j$ represents the elevation angular acceleration aiding signal;
- $\omega_j$ represents the elevation angular rate command signal; and
- $\lambda_E$ represents the elevation deflection angle of said gimbaled sensor.

* * * * *